(12) United States Patent
Sato et al.

(10) Patent No.: US 6,964,057 B2
(45) Date of Patent: Nov. 8, 2005

(54) CASE FOR DISK DEVICE FOR REPRODUCING OR RECORDING INFORMATION

(75) Inventors: Kiyofumi Sato, Kanagawa (JP); Satoru Manabe, Kanagawa (JP); Tsuneo Uwabo, Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 165 days.

(21) Appl. No.: 10/417,101

(22) Filed: Apr. 17, 2003

(65) Prior Publication Data

US 2003/0210635 A1   Nov. 13, 2003

(30) Foreign Application Priority Data

Apr. 19, 2002  (JP) ............................ P2002-118192

(51) Int. Cl.$^7$ ............................................. G11B 17/03
(52) U.S. Cl. ..................................................... 720/655
(58) Field of Search ........................ 360/97.03, 97.01; 720/655, 652; 361/683–685; 312/223.1, 312/223.2

(56) References Cited

U.S. PATENT DOCUMENTS

| 4,937,806 | A | * | 6/1990 | Babson et al. ............... 720/651 |
| 5,379,990 | A | * | 1/1995 | Ando et al. .................... 267/34 |
| 5,488,523 | A | * | 1/1996 | Seaver et al. ............. 360/99.12 |
| 5,898,537 | A | * | 4/1999 | Oizumi et al. ............ 360/97.01 |
| 6,272,011 | B1 | * | 8/2001 | Chen .......................... 361/685 |

* cited by examiner

Primary Examiner—David Davis
(74) Attorney, Agent, or Firm—Whitham, Curtis & Christofferson, PC

(57) ABSTRACT

A case of a disk device includes a case body, having a bottom plate and a pair of side plates extending upright respectively from opposite side edges of the bottom plate, a lid member, provided substantially parallel to the bottom plate, and is connected to the two side plates, a box member, contained in the case body and the lid member assembled each other, and a positioning member, positioning the box member relative to the case body and the lid member.

13 Claims, 5 Drawing Sheets

CASE FOR DISK DEVICE FOR REPRODUCING OR RECORDING INFORMATION

BACKGROUND OF THE INVENTION

This invention relates to a case of a disk device, for example such as a reproducing device for an optical disk.

There are known disk devices for reproducing or recording/reproducing information relative to an optical disk such as a CD-ROM, a CD-R and a DVD. Such a disk device includes a box-like (frame-like) box member, forming a framework of a device body, a disk tray movable relative to the box member between a position where an optical disk is loaded and a position where the optical disk is discharged, and an outer case containing the box member. An optical disk drive mechanism for rotating the optical disk, an optical pickup for optically reading information recorded in the optical disk, and an optical pickup-moving mechanism for moving the optical pickup in a direction of the radius of the optical disk are mounted on the box member.

In this related disk device, the outer case includes a case body having a bottom plate and a pair of side plates extending upright respectively from opposite side edges of the bottom plate, and a lid member which is provided substantially parallel to the bottom plate, and is connected to the two side plates.

For assembling the box member and the outer case together, the case body and the box member are fastened together by screws at a plurality of portions, and the lid member and the box member are fastened together by screws at a plurality of portions, and further the lid member and the case body are fastened together by screws.

In this assembling structure, however, the number of the screw-fastening portions is extremely large (for example, the total of screw-fastening portions is 15 or more), and therefore the structure is complicated, and the number of the screws to be used is large. Therefore, there have been encountered problems that the number of the component parts increases and that the assembling time is long.

And besides, for example, when a lateral impact is applied to the related disk device, there has been encountered a problem that a large force instantaneously concentrates on the fixing portion of the box member fixed to the outer case, so that this fixed portion may be damaged.

SUMMARY OF THE INVENTION

It is therefore an object of the present invention to provide a case of a disk device which is simple in structure, and can reduce the number of component parts. Another object is to provide a case of a disk device which is excellent in resistance to an impact.

These objects have been achieved by the invention recited in the following Paragraphs (1) to (13).

(1) A case of a disk device comprising:
a case body, having a bottom plate and a pair of side plates extending upright respectively from opposite side edges of the bottom plate;
a lid member, provided substantially parallel to the bottom plate, and is connected to the two side plates;
a box member, contained in the case body and the lid member assembled each other; and
a positioning member, positioning the box member relative to the case body and the lid member.

(2) A case of a disk device according to the above Paragraph (1), wherein the positioning member includes a plurality of bosses formed on the box member, and holes formed in the case body and the lid member; and
wherein the bosses are inserted in the holes, respectively.

(3) A case of a disk device according to the above Paragraph (2), wherein at least four bosses are formed on the box member;
wherein the case body has a first hole and a second hole in which the bosses are inserted, respectively, and the first hole is disposed on one side plate side of the side plates; and the second hole is disposed on other side plate side of the side plates; and
wherein the lid member has the third hole and the fourth hole in which the bosses are inserted, respectively, the third hole is disposed on the one side plate side of the side plates, and the fourth hole is disposed on the other side plate side of the side plates.

(4) A case of a disk device according to the above Paragraph (3), wherein each of the first and fourth holes is a hole in which the corresponding boss is fitted with substantially no joint gap; and
wherein each of the second and third holes is a hole which receives the corresponding boss in a manner to allow the movement thereof in one direction in the hole.

(5) A case of a disk device according to the above Paragraph (3), wherein each of the bosses has a round shape in cross-section;
wherein each of the first and fourth holes is a round hole in which the corresponding boss is fitted with substantially no joint gap; and
wherein each of the second and third holes is a slot extending in a first direction in which the side plates are opposed.

(6) A case of a disk device according to the above Paragraph (3), wherein each of the second and third holes is a hole in which the corresponding boss is fitted with substantially no joint gap; and
wherein each of the first and fourth holes is a hole which receives the corresponding boss in a manner to allow the movement thereof in one direction in the hole.

(7) A case of a disk device according to the above Paragraph (3), wherein each of the bosses has a round shape in cross-section
wherein each of the second and third holes is a round hole in which the corresponding boss is fitted with substantially no joint gap; and
wherein each of the first and fourth holes is a slot extending in a first direction in which the side plates are opposed.

(8) A case of a disk device according to the above Paragraph (2), wherein each of the bosses has a round shape in cross-section; and
wherein the holes has a two type holes, a first type hole is a round hole in which the corresponding boss is fitted with substantially no joint gap, and a second type hole is a slot, extending in a first direction in which the side plates are opposed, in which the corresponding boss is received in a manner to allow the movement thereof in the one direction in the hole.

(9) A case of a disk device according to the above Paragraph (2) wherein a distal end portion of each of the bosses is decreasing in outer diameter gradually toward a distal end thereof.

(10) A case of a disk device according to the above Paragraph (1), wherein the lid member is screw-fastened to the box member at four portions, that is, at a first pair of portions separated in a second direction perpendicular to a first direction first direction in which the side plates are opposed, disposed on the one side plate side of the side plates and a second pair of portions separated in the second direction, disposed on the other side plate side of the side plates.

(11) A case of a disk device according to (10), wherein the positioning member is disposed in a region linking the first pair of portions and the second pair of portions.

(12) A case of a disk device according to any one of the above Paragraphs (1) to (11), wherein the box member is screw-fastened to the case body at two to four portions thereof.

(13) A case of a disk device according to any one of Paragraphs (1) to (12), wherein a drive system for rotating a disk-like recording medium is mounted on the box member.

As described above, in the present invention, the case of the disk device can be simplified in structure, and the number of the screws to be used is small, and the number of the component parts can be reduced. And besides, since the number of the screw-fastening portions is reduced, the time, required for the assembling operation, can be reduced, so that the productivity can be enhanced.

In the normal condition, the positioning of the box member relative to the case is positively effected, and for example, when a lateral impact acts on the case, damage of the constituent portions (bosses and so on) of the positioning means can be effectively prevented, thus enhancing the resistance to an impact.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of a case of the invention for a disk device will now be described in detail with reference to the accompanying drawings.

Figure 1:
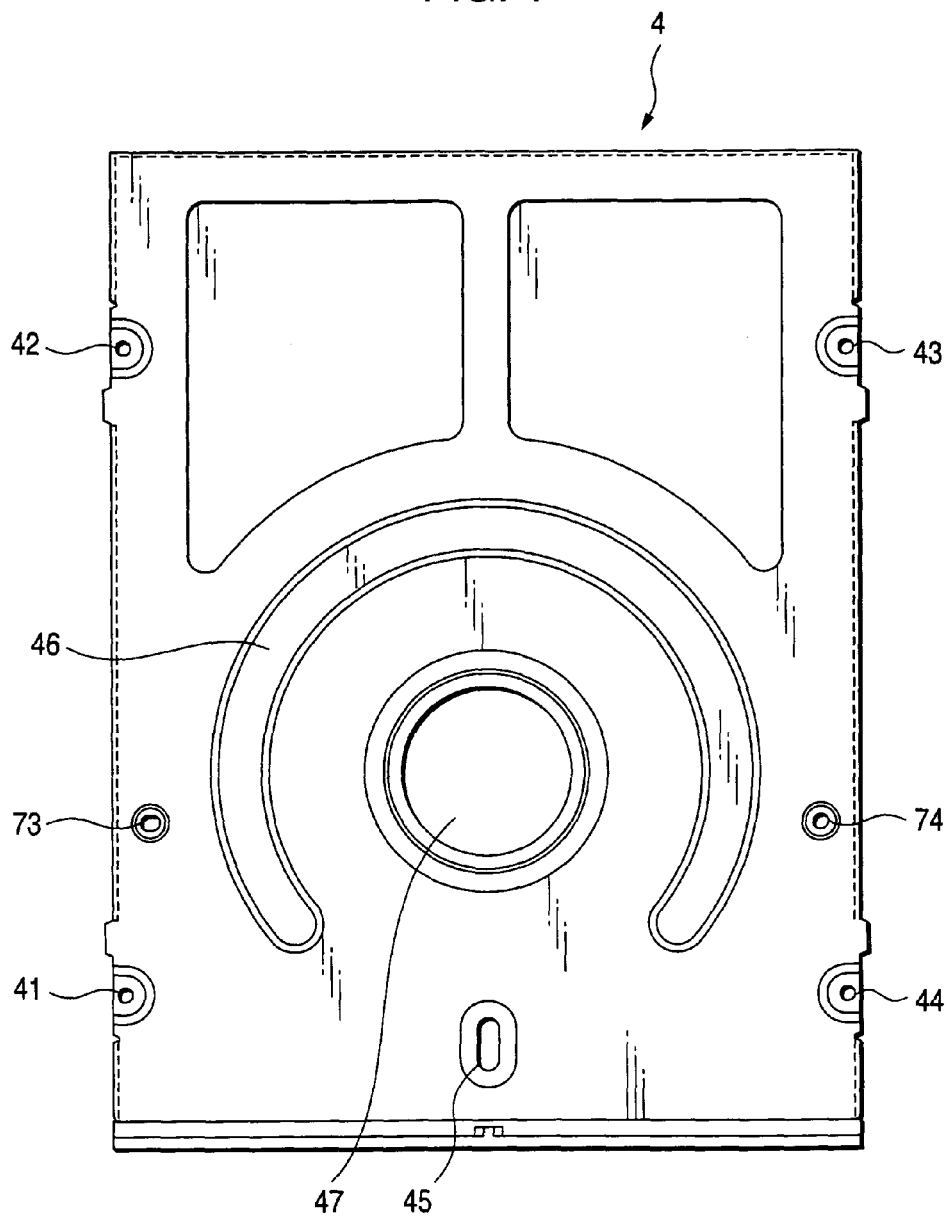
FIG. 1 is a plan view showing a lid member in a preferred embodiment of a disk device case of the invention.
Figure 2:
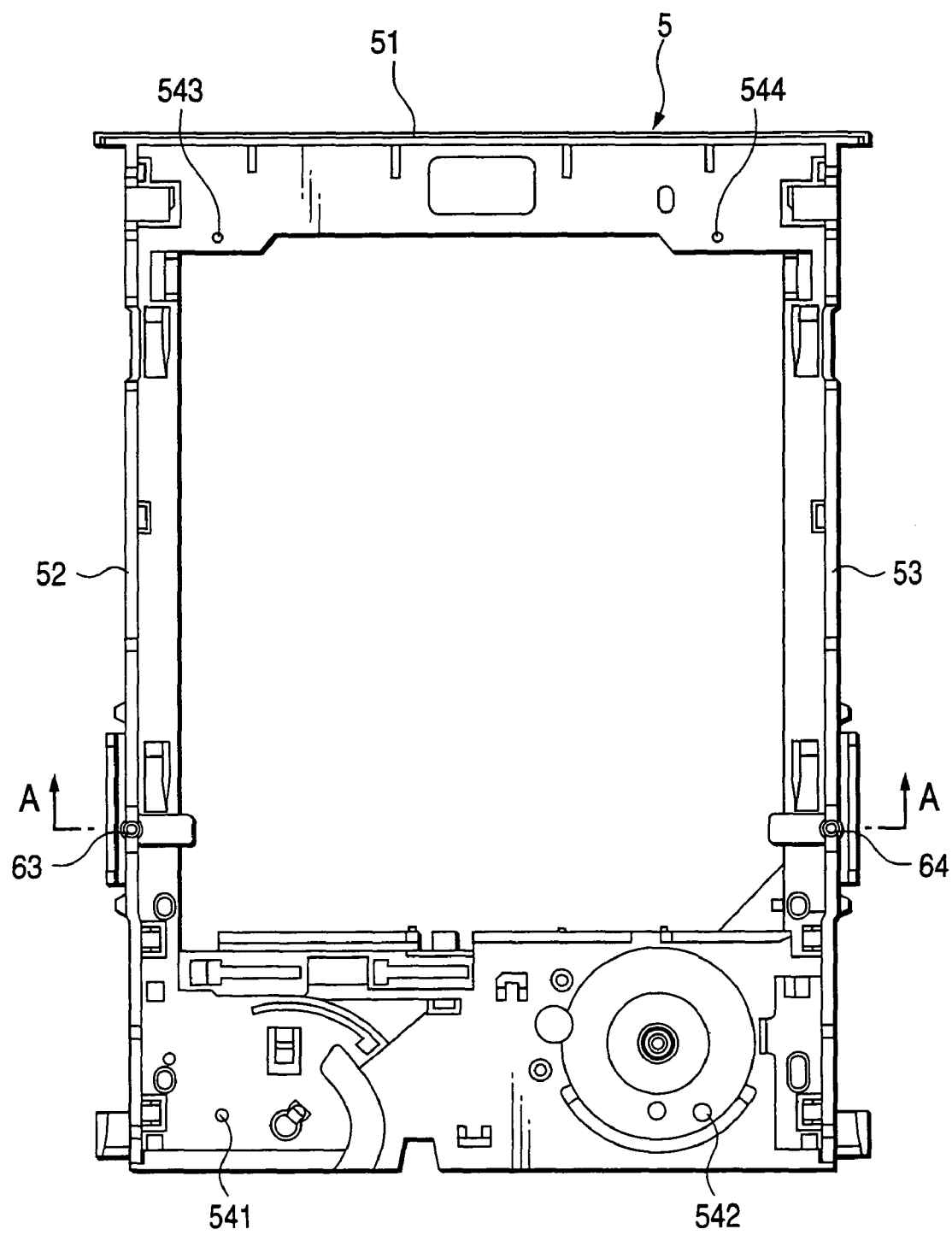
FIG. 2 is a plan view showing a box member in the embodiment of the disk device case of the invention.
Figure 3:
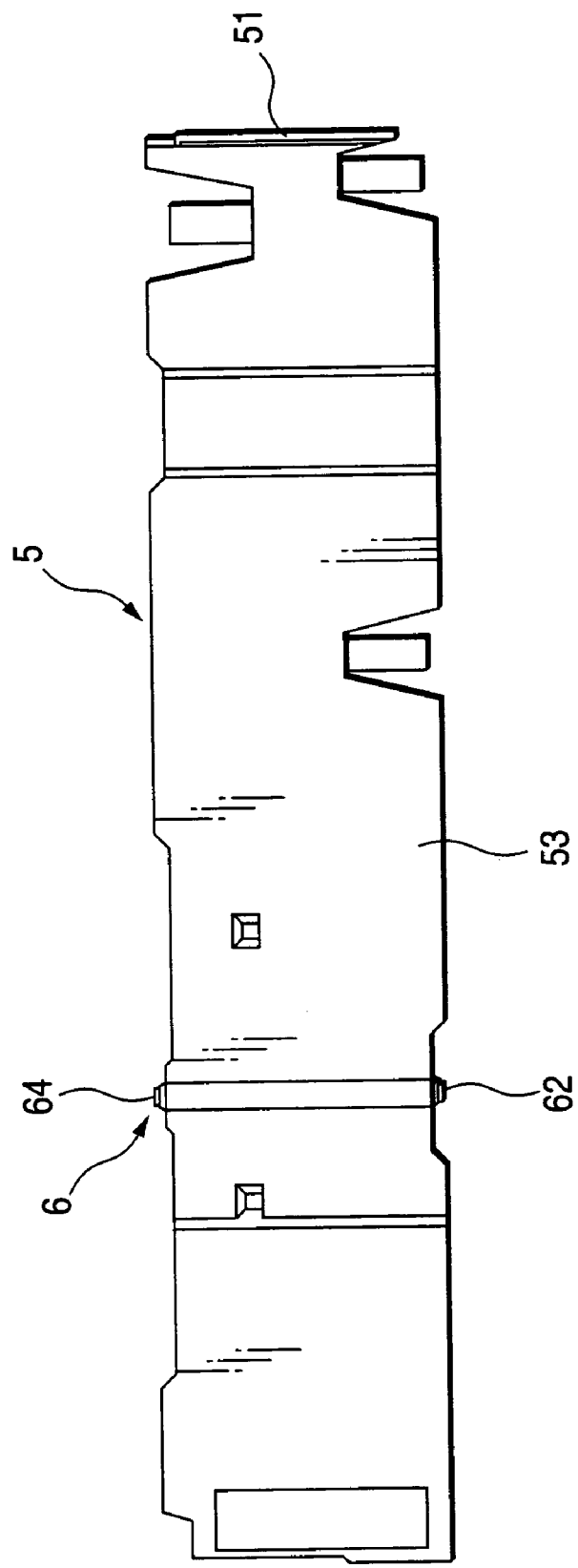
FIG. 3 is a side-elevational view showing the box member in the embodiment of the disk device case of the invention.
Figure 4:
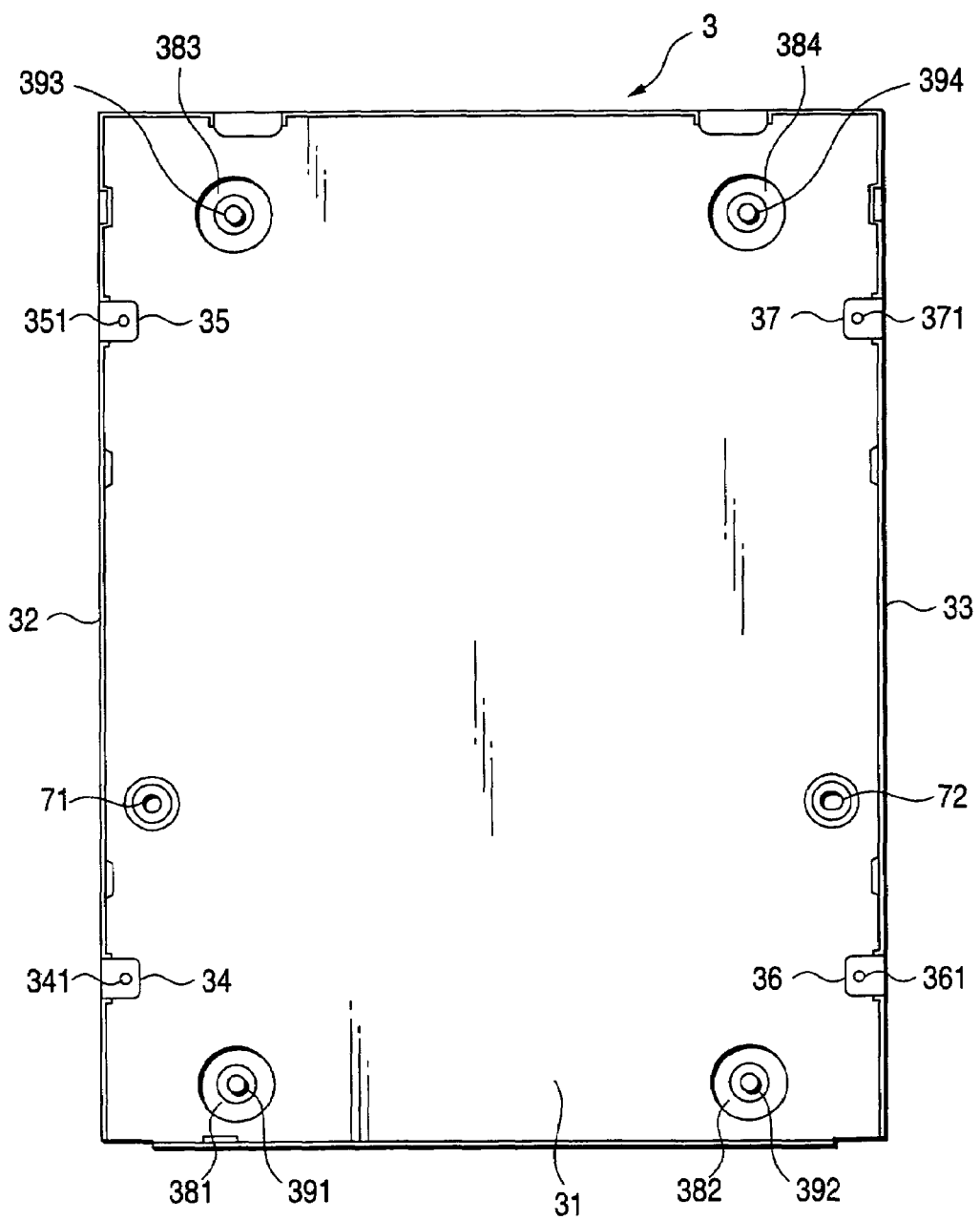
FIG. 4 is a plan view showing a case body in the embodiment of the disk device case of the invention.
Figure 5:
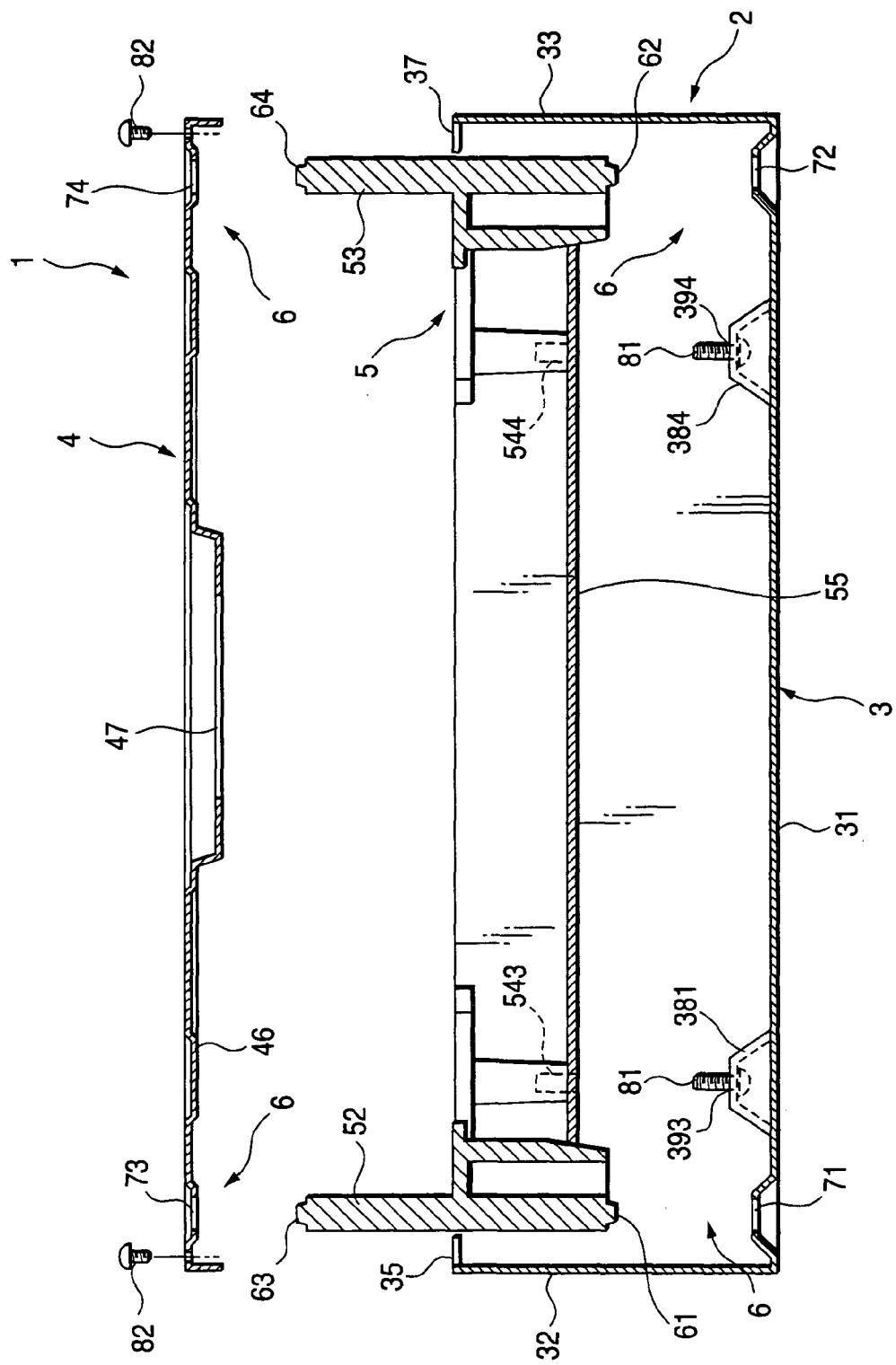
FIG. 5 is an exploded, cross-sectional view of the embodiment of the disk device case of the invention taken along the line A—A of FIG. 2.

FIG. 1 is a plan view showing a lid member of the disk device case according to the embodiment of the invention, FIGS. 2 and 3 are a plan view and a side-elevational view, respectively, showing a box member of the disk device case according to the embodiment of the invention, FIG. 4 is a plan view showing a case body of the disk device case according to the embodiment of the invention, and FIG. 5 is an exploded, cross-sectional view of the disk device case taken along the line A—A of FIG. 2. For description purposes, in FIGS. 1 to 4, the upper side will be referred to as "rear" or "rear side", and the lower side will be referred to as "front" or "front side". In FIG. 5, the upper side will be referred to as "upper portion" or "upper side", and the lower side will be referred to as "lower portion" or "lower side".

The case 1 for the disk device of the invention has the function of reproducing information (or has the function of recording/reproducing information) recorded in a CD, a CD-ROM, a CD-R, a CD-RW, a DVD, a DVD-R, a DVD-RW, etc., for music and others. This case is used as an exterior part for a disk device mounted on a body of a computer device (not shown) such as a personal computer. This disk device case 1 includes an outer case 2 formed by the case body 3 and the lid member 4, the box member 5 contained in the outer case 2, and a positioning member 6 for positioning the box member 5 relative to the case body 3 and the lid member 4.

The box member 5 is a box-like (frame-like) member forming a skeleton of a device body of the disk device, and preferably this box member is a resin-molded product. This box member 5 includes a rear plate 51, and a pair of opposed side plates 52 and 53.

A chassis (base member) is mounted on the box member 5 so as to be pivotally moved about its rear end portion relative to the box member 5, and further a disk tray (not shown) for supporting an optical disk thereon and for conveying the optical disk, a drive mechanism (not shown) for effecting the pivotal movement of the chassis and the movement of the disk tray, a main circuit board 55 and so on are mounted on the box member 5, the disk tray being disposed above the chassis, and the main circuit board 55 being disposed below the chassis.

A drive system for rotating the optical disk, an optical pickup (optical head) having the function of reading information recorded in the optical disk, and a moving mechanism for moving the optical pickup in a direction of the radius of the optical disk are mounted on the chassis. The chassis, the optical disk-rotating drive mechanism, the optical pickup and the optical pickup-moving mechanism jointly form a thread mechanism unit. The box member has an opening formed in its front side, and the disk tray can be inserted and withdrawn through this opening.

Screw holes (thread holes) 541, 542, 543 and 544 are formed in four corner portions (vicinities of four corners) of the box member 5, respectively.

The case body 3 includes a bottom plate 31, and a pair of side plates 32 and 33 respectively formed on and extending upright substantially perpendicularly from opposite side edges of the bottom plate 31, and these plates are integrally formed. Preferably, this case body 3 is made of a sheet-like member (i.e., a metal sheet) which is formed into a desired shape by plastic working such as pressing.

Bent tabs 34 and 35 are formed on an upper edge of the side plate 32, and are spaced a predetermined distance from each other. The bent tabs 34 and 35 are formed respectively by extension portions each of which extends upwardly from the upper edge of the side plate 32, and is bent substantially perpendicularly toward the inside of the case body 3.

Similarly, bent tabs 36 and 37 are formed on an upper edge of the side plate 33, and are spaced a predetermined distance from each other. The bent tabs 36 and 37 are formed respectively by extension portions each of which extends upwardly from the upper edge of the side plate 33, and is bent substantially perpendicularly toward the inside of the case body 3.

Screw holes (thread holes) 341, 351, 361 and 371 are formed through the bent tabs 34, 35, 36 and 37, respectively.

Raised portions 381, 382, 383 and 384 are formed at four corner portions (vicinities of four corners) of the bottom plate 31, respectively, and project (bulge) upwardly (into the interior of the outer case 2). Screw holes (thread holes) 391, 392, 393 and 394 are formed through top portions of the raised portions 381, 382, 383 and 384, respectively. These screw holes 391 to 394 are formed so as to be opposed respectively to the screw holes 541 to 544 formed in the box member 5.

The lid member 4 is mounted substantially parallel to the bottom plate 31, and is connected to the upper edges of the two side plates 32 and 33. Preferably, the lid member 4 is made of a sheet-like member (i.e., a metal sheet) which is formed into a desired shape by plastic working such as pressing.

Screw holes (thread holes) 41, 42, 43 and 44 are formed respectively through those portions of the lid member 4 which are opposed respectively to the screw holes 341, 351, 361 and 371 formed through the case body 3.

A convex portion 45 (functioning as a guide portion for controlling the posture of the optical disk to prevent it from being caught) for preventing the erroneous insertion of the optical disk, an arcuately-extending ridge 46 for adjusting an air stream during the rotation of the optical disk are formed on the lid member 4. The convex portion 45 and the ridge 46 project from the lower surface of the lid member 4. A disk damper (not shown) for holding the optical disk is mounted in an open portion 47 disposed inside of the ridge 46.

The box member 5 of the above construction is positioned relative to the outer case 2 (that is, relative to the case body 3 and the lid member 4) by the positioning member 6. The construction of the positioning member 6 will be described below in detail.

The positioning member 6 includes four bosses 61, 62, 63 and 64 formed on the box member 5, first and second holes (boss holes) 71 and 72 which are formed in the case body 3 so as to receive the bosses 61 and 62, respectively, and third and fourth holes (boss holes) 73 and 74 which are formed in the lid member 4 so as to receive the bosses 63 and 64, respectively.

As shown in FIG. 5, the bosses 61, 62, 63 and 64 are formed respectively at a lower left portion, a lower right portion, an upper left portion and an upper right portion of the box member when viewed from the front side thereof. Namely, the boss 61 is formed on and projects downwardly from the lower edge of the side plate 52. The boss 62 is formed on and projects downwardly from the lower edge of the side plate 53. The boss 63 is formed on and projects upwardly from the upper edge of the side plate 52. The boss 64 is formed on and projects upwardly from the upper edge of the side plate 53.

Each of the bosses 61, 62, 63 and 64 has a round transverse cross-section, and its distal end portion is decreasing in outer diameter gradually toward its distal end. Namely, in this embodiment, each of the bosses 61, 62, 63 and 64 is chamfered at the outer peripheral surface of the distal end portion thereof, and has a truncated cone-shape. With this construction, each of the bosses 61, 62, 63 and 64 can be easily and accurately inserted into the corresponding hole.

The first hole 71 and the second hole 72 are through holes, respectively, which are formed through the bottom plate 31 of the case body 3. The third hole 73 and the fourth hole 74 are through holes, respectively, which are formed through the lid member 4. In this case, the first hole 71 and the fourth hole 74 are round holes, respectively, into which the bosses 61 and 64 are fitted, respectively, with substantially no play (no joint gap). The second hole 72 and the third hole 73 are slots, respectively, which extend in the right-left direction (the lateral direction in FIGS. 1, 4 and 5). Therefore, the bosses 62 and 63, inserted respectively in the second and third holes 72 and 73, are allowed to move respectively in these slots along the length thereof.

The positioning member 6 has the above construction, and therefore even when a lateral (lateral direction in FIGS. 1, 2, 4 and 5) impact (an instantaneous stress or the like) is applied to the case 1 of the disk device, the bosses 61 to 64 are prevented from damage (breakage, chipping or the like). More specifically, when a lateral stress acts on the case 1 of the disk device, the bosses 62 and 63, disposed diagonally when viewed from the front side, can slightly move in the second and third holes (slots) 72 and 73, respectively. Therefore the box member 5 can be easily elastically deformed. As a result, the stress is prevented from instantaneously concentrating not only on the bosses 62 and 63, fitted in the respective slots, but also on the bosses 61 and 64 fitted in the respective round holes, so that these bosses are prevented from damage.

When the box member 5, the case body 3 and the lid member 4 are assembled together so that the box member 5 is contained in the outer case 2, the bosses 61, 62, 63 and 64 are inserted into the first, second, third and fourth holes 71, 72, 73 and 74, respectively. As a result, the box member 5 is properly positioned relative to the case body 3 and the lid member 4.

In this case, all of the first to fourth holes 71 to 74 are not slots, but the first and fourth holes 71 and 74, disposed diagonally when viewed from the front side, are the round holes, respectively, in which the bosses 61 and 64 are fitted, respectively, with substantially no play. Therefore, in a normal condition, that is, when a lateral impact does not act on the case 1 of the disk device, the positioning can be positively effected without misregistration or the like.

When viewed from the top, the positioning member 6 (the bosses 61 to 64 and the first, second, third and fourth holes 71, 72, 73 and 74) is provided at a predetermined region (region indicated by the line A—A in FIG. 2) disposed between a line, interconnecting the screw holes 41 and 44 in the lid member 4, and a line interconnecting the screw holes 42 and 43 (See FIG. 1). Therefore, the box member 5 can be positioned relative to the outer case 2 in a well-balanced manner at the smaller number of portions.

The box member 5, while positioned by the positioning member 6, is screw-fastened to the case body 3, and also the case body 3 is screw-fastened to the lid member 4. By doing so, the assemblage is completed. In this case, the box member 5 is not directly screw-fastened to the lid member 4.

The screw-fastening of the box member 5 to the case body 3 is effected by threading screws 81 respectively into the screw holes (thread holes) 391 to 394 and also respectively into the corresponding screw holes (thread holes) 541 to 544 and then by tightening these screws.

The screw-fastening of the case body 3 to the lid member 4 is effected by threading screws 82 respectively into the screw holes 41 to 44 and also respectively into the corresponding screw holes 341, 351, 361 and 371 and then by tightening these screws.

Thus, the screw-fastening portions are uniformly distributed, and besides the box member 5 and the lid member 4 are not directly screw-fastened together, and therefore the total of the screw-fastening portions is eight, and is much reduced as compared with the related construction. As a result, the structure of the case 1 of the disk device can be simplified, and the number of the screws to be used is reduced, and the number of the component parts can be reduced. And besides, since the number of the screw-fastening portions is small, the time, required for the assembling operation, can be reduced, so that the productivity can be enhanced.

The positioning member 6 is not limited to the above construction, and for example in a reverse manner to the above construction, the first and fourth holes 71 and 74 may be slots extending in the right-left direction (the lateral direction in FIGS. 1, 4 and 5), while the second hole 72 and the third hole 73 may be round holes, respectively, into which the bosses 62 and 63 are fitted, respectively, with substantially no joint gap.

Although the disk device case of the invention has been described above by way of the illustrated embodiment thereof, the invention is not limited to this embodiment, and the various portions, forming the case of the disk device, can be replaced by those of arbitrary constructions performing similar functions. And besides, arbitrary constituent portion or portions may be added.

In the above embodiment, for example, the second hole 72 and the third hole 73 can be formed respectively as slots extending in the forward-rearward direction, while the other holes have the above-mentioned construction. With this construction, the case of the disk device, while enabling the positive positioning, can exhibit excellent resistance to an impact applied in the forward-rearward direction.

In the above embodiment, the first hole 71 and the forth hole 74 can be formed respectively as slots extending in the forward-rearward direction, while the other holes have the above-mentioned construction. With this construction, the case of the disk device, while enabling the positive positioning, can exhibit excellent resistance to an impact applied in either of the lateral direction and the forward-rearward direction.

What is claimed is:

1. A case of a disk device comprising:
   a case body, having a bottom plate and a pair of side plates extending upright respectively from opposite side edges of the bottom plate;
   a lid member, provided substantially parallel to the bottom plate, and is connected to the two side plates;
   a box member, contained in the case body and the lid member assembled each other; and
   a positioning member, positioning the box member relative to the case body and the lid member;
   wherein the positioning member includes a plurality of bosses formed on the box member, and holes formed in the case body and the lid member;
   wherein the bosses are inserted in the holes, respectively;
   wherein at least one of the holes in which the corresponding boss is fitted with substantially no joint gap; and
   wherein the other of the hole which receives the corresponding boss so as to allow a movement of the corresponding boss in one direction in the hole.

2. The case as set forth in claim 1, wherein at least four bosses are formed on the box member;
   wherein the case body has a first hole and a second hole in which the bosses are inserted, respectively, and the first hole is disposed on one side plate side of the side plates; and the second hole is disposed on other side plate side of the side plates; and
   wherein the lid member has the third hole and the fourth hole in which the bosses are inserted, respectively, the third hole is disposed on the one side plate side of the side plates, and the fourth hole is disposed on the other side plate side of the side plates.

3. The case as set forth in claim 2, wherein each of the first and fourth holes is a hole in which the corresponding boss is fitted with substantially no joint gap; and
   wherein each of the second and third holes is a hole which receives the corresponding boss in a manner to allow the movement thereof in one direction in the hole.

4. The case as set forth in claim 2, wherein each of the bosses has a round shape in cross-section;
   wherein each of the first and fourth holes is a round hole in which the corresponding boss is fitted with substantially no joint gap; and
   wherein each of the second and third holes is a slot extending in a first direction in which the side plates are opposed.

5. The case as set forth in claim 2, wherein each of the second and third holes is a hole in which the corresponding boss is fitted with substantially no joint gap; and
   wherein each of the first and fourth holes is a hole which receives the corresponding boss in a manner to allow the movement thereof in one direction in the hole.

6. The case as set forth in claim 2, wherein each of the bosses has a round shape in cross-section
   wherein each of the second and third holes is a round hole in which the corresponding boss is fitted with substantially no joint gap; and
   wherein each of the first and fourth holes is a slot extending in a first direction in which the side plates are opposed.

7. The case as set forth in claim 1, wherein each of the bosses has a round shape in cross-section; and
   wherein the holes has a two type holes, a first type hole is a round hole in which the corresponding boss is fitted with substantially no joint gap, and a second type hole is a slot, extending in a first direction in which the side plates are opposed, in which the corresponding boss is received in a manner to allow the movement thereof in the one direction in the hole.

8. The case as set forth in claim 1, wherein a distal end portion of each of the bosses is decreasing in outer diameter gradually toward a distal end thereof.

9. The case as set forth in claim 1, wherein the lid member is screw-fastened to the box member at four portions, that is, at a first pair of portions separated in a second direction perpendicular to a first direction first direction in which the side plates are opposed, disposed on the one side plate side of the side plates and a second pair of portions separated in the second direction, disposed on the other side plate side of the side plates.

10. The case as set forth in claim 9, wherein the positioning member is disposed in a region linking the first pair of portions and the second pair of portions.

11. The case as set forth in claim 1, wherein the box member is screw-fastened to the case body at two to four portions thereof.

12. The case as set forth in claim 1, wherein a drive system for rotating disk shaped recording medium is mounted on the box member.

13. The case as set forth in claim 1, wherein the case body has a first fixing member which fixes the box member; and
   wherein the lid member has a second fixing member which fixes the case body.

* * * * *